UNITED STATES PATENT OFFICE.

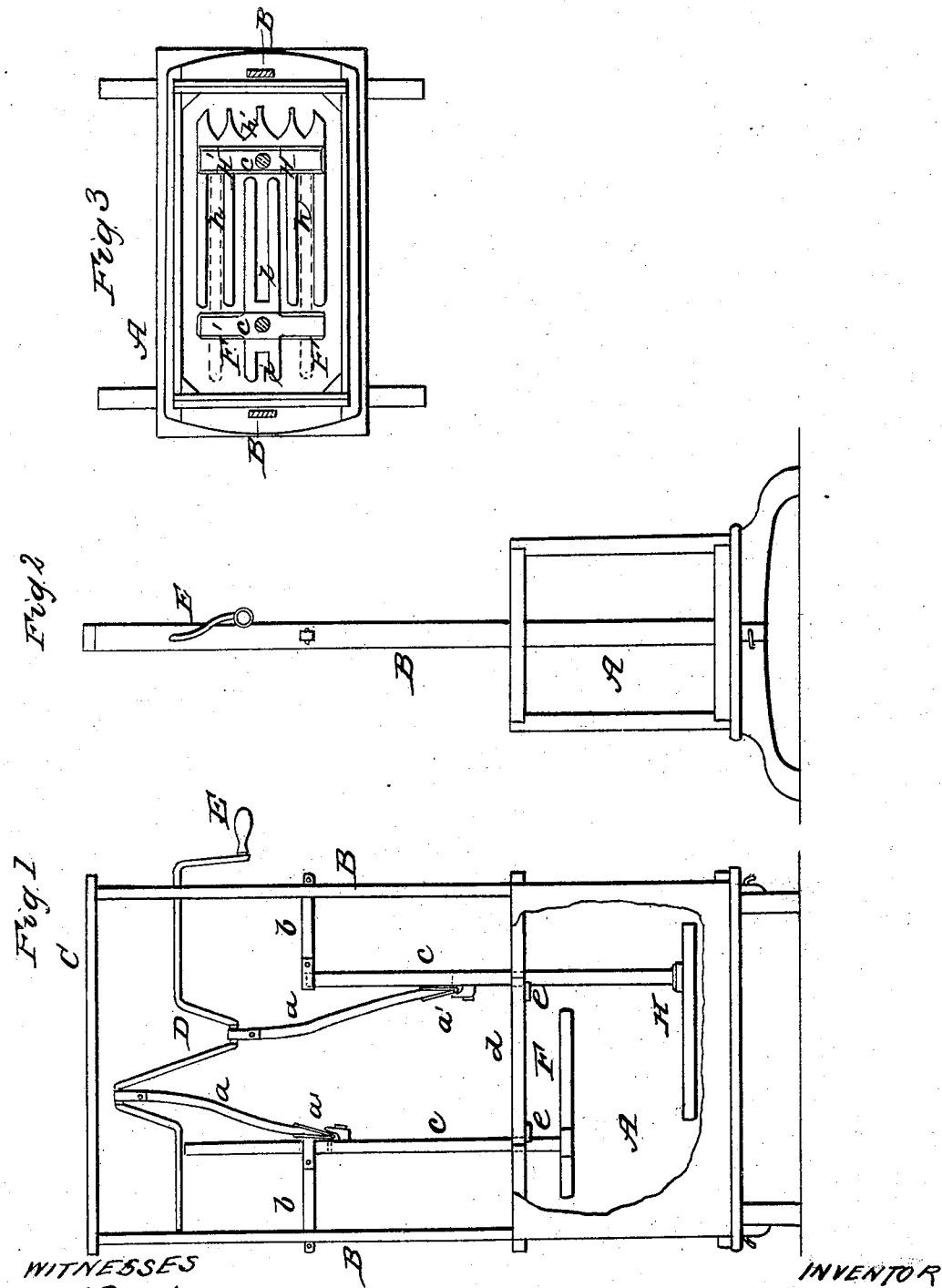

LEONARD BACON, OF CHARLOTTE, MICHIGAN.

IMPROVEMENT IN CHURNS.

Specification forming part of Letters Patent No. 43,632, dated July 26, 1864.

*To all whom it may concern:*

Be it known that I, L. BACON, of Charlotte, in the county of Eaton and State of Michigan, have invented certain new and useful Improvements in Churns; and I do hereby declare that the following is a full and complete description of the construction and operation of the same, reference being had to the accompanying drawings, making a part of this specification, in which—

Figure 1 is a side view of the churn with a portion of the side removed, to represent the dashers. Fig. 2 is an end view. Fig. 3 is a top view with the cover removed.

Like letters of reference indicate like parts.

The nature of my improvement relates to the form and arrangement of the dashers, which have a vertical motion, and to the manner of operating them, requiring much less labor than is required to churn with the vertical or rotating dashers in ordinary use.

A represents the body of the churn, which can be made in any desired form and of any suitable material.

B B are standards secured to the ends of the churn, and kept in place at the top by the cross-piece C.

$b\ b$ are guides secured to the standards midway between the top of the churn and the piece C.

D represents a double crank, to which is attached the connecting-rods $a\ a$, that are pivoted at $a'$ to the arms $c\ c$ of the dashers F H. These arms pass up and move in the guides $b\ b$. The dashers are constructed as represented in Fig. 3, the dasher H having double fingers $h\ h$, secured to one side of the cross-piece H', with projections or fingers $h'$ on the other side. The dasher F has double fingers $i$ in the center, that move between the fingers $h\ h$ of the other dasher, and there are also fingers $i'$ on the outside. There can be other fingers attached to the dasher F, as indicated by the dotted lines, if desired.

The cover consists of three pieces fitting closely on the top of the churn, with round openings for the arms $c\ c$ of the dashers to move in, which serve also as guides to keep the dashers in place as they move up and down. There are also pieces $ee$ across the top, that keep the dashers in place when the lid in the center is removed at any time.

The dashers are operated or moved vertically up and down by turning the crank D by means of the handle E. They are so arranged in connection with the crank that they move reversely to each other—while one is going up the other is coming down, their relative position being represented in Fig. 1. And this reverse movement of the dashers, together with their peculiar construction, as described, agitates the entire quantity of milk, breaking effectually the globules, which produce the requisite quantity of butter in the shortest possible time.

The two dashers, being operated by a crank, require less labor than to operate one by hand, and from their construction and arrangement they break the cream much more effectually than those in ordinary use. Hence churning done in this manner must require much less time and labor than in the ordinary mode of churning.

What I claim as my improvement, and desire to secure by Letters Patent, is—

The special arrangement of reciprocating dashers with the fingers $h\ h\ h'$ and $i\ i\ i'$, in combination with the case A, guides $b\ b$, arms $c\ c$, rods $a\ a$, pivoted to the arms, and double crank D, when operating conjointly in the manner and for the purpose set forth.

LEONARD BACON.

Witnesses:
G. T. RAND,
LUMAN FOOTE.